(12) United States Patent
Anand et al.

(10) Patent No.: US 9,497,234 B2
(45) Date of Patent: Nov. 15, 2016

(54) IMPLICIT SOCIAL GRAPH CONNECTIONS

(71) Applicant: Facebook, Inc., Menlo Park, CA (US)

(72) Inventors: Abheek Anand, San Francisco, CA (US); Julia Lee, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 684 days.

(21) Appl. No.: 13/728,848

(22) Filed: Dec. 27, 2012

(65) Prior Publication Data
US 2014/0189530 A1   Jul. 3, 2014

(51) Int. Cl.
| | |
|---|---|
| *G06F 3/048* | (2013.01) |
| *H04L 29/06* | (2006.01) |
| *G06Q 30/02* | (2012.01) |
| *G06Q 30/06* | (2012.01) |
| *G06Q 50/00* | (2012.01) |

(52) U.S. Cl.
CPC ............ *H04L 65/403* (2013.01); *G06Q 30/02* (2013.01); *G06Q 30/06* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,606,721 | B1* | 12/2013 | Dicker | ........................ 705/319 |
| 2006/0294134 | A1* | 12/2006 | Berkhim | ........... G06F 17/30616 |
| 2008/0040475 | A1* | 2/2008 | Bosworth et al. | ............ 709/224 |
| 2008/0275899 | A1 | 11/2008 | Baluja et al. | |
| 2010/0058196 | A1 | 3/2010 | Krishnan et al. | |
| 2012/0030578 | A1 | 2/2012 | Athsani et al. | |
| 2012/0278476 | A1 | 11/2012 | Agrawal et al. | |
| 2012/0317200 | A1 | 12/2012 | Chan | |
| 2013/0212491 | A1* | 8/2013 | Yerli | ............................. 715/753 |
| 2013/0318180 | A1* | 11/2013 | Amin | .................... H04L 65/403 |
| | | | | 709/206 |

FOREIGN PATENT DOCUMENTS

| | | |
|---|---|---|
| JP | 2010515160 A | 5/2010 |
| JP | 2010523613 A | 7/2010 |
| JP | 2010226400 A | 10/2010 |
| JP | 2010537323 A | 12/2010 |
| JP | 2011227892 A | 11/2011 |

OTHER PUBLICATIONS

International Search Report and Written Opinion of International Application No. PCT/US2013/078101, Feb. 28, 2014, pp. 1-7.
Office Action mailed Aug. 23, 2016, for Japanese Patent Application No. 2015-550817 filed Dec. 27, 2013, pp. 1-3.
U.S. Appl. No. 13/728,848 by Liu et al., filed Dec. 27, 2012.

\* cited by examiner

*Primary Examiner* — William Trapanese
(74) *Attorney, Agent, or Firm* — Perkins Coie LLP

(57) ABSTRACT

A method includes: determining a first user interaction on a social network system; identifying a social network object in the social network system associated with the first user interaction by traversing a social graph of the social network system; identifying a user account based on the first user interaction; generating an implicit social graph connection between the user account and the social network object; and selecting a content entry for displaying to a user device signed-in under the user account or a friend account based on the implicit social graph connection, the friend account socially connected to the user account via the social graph of the social network system.

20 Claims, 18 Drawing Sheets

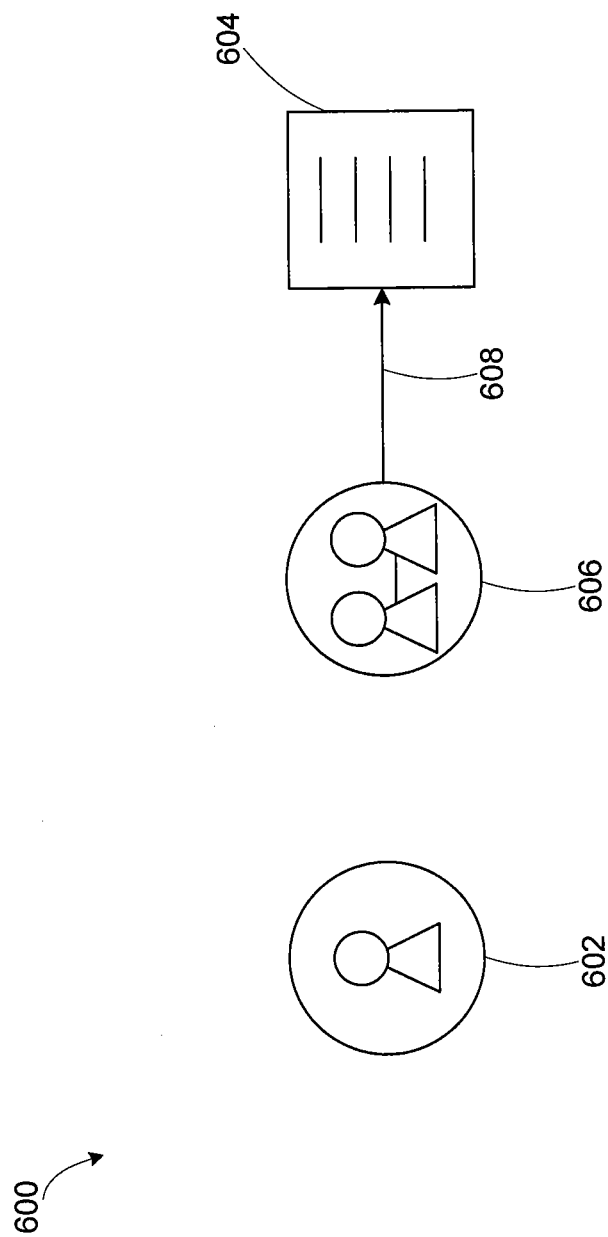

IMPLICIT SOCIAL GRAPH CONNECTIONS

FIELD OF INVENTION

This invention relates generally to social networking, and in particular to inferring social graph connections from a social networking system.

BACKGROUND

Social networking systems commonly provide mechanisms allowing users to interact within their social networks. A social networking system user may be an individual or any other entity, such as a business or other non-person entity. A variety of relationships can be tracked within a social networking system, including connections amongst the users and social objects within the social networking system, such as between a user to another user, between a user to a social object, and between a social object to another social object. A social object may be, for example, one or more of a social networking system user, a non-person entity, a content item, a group, a social networking system page, an event, a message, a subject (such as persons, places, things, abstract ideas or concepts), a multimedia, or any combination thereof.

Social networking system information that is tracked and maintained by a social networking system may be stored as a social graph, which includes a plurality of nodes that are interconnected by a plurality of edges. A social graph node may represent a social networking system object that can act on and/or be acted upon by another node. Each of these interactions can be stored as an edge of the social graph. In some embodiments, the edges can be represented as bi-directional. In other embodiments, the edges can be represented as directional. For example, a user node checking into a social network page for a place, can be represented by either a bi-directional edge between the user node and the social network page or a directional edge from the user node to the social network page. The social graph can thus be stored as a database of edges between nodes. In some embodiments, the social graph can be stored separately for user interactions of a specific kind. In other embodiments, the social networking system stores the social graph without discriminating the type of user interactions.

An edge between nodes in a social graph represents a particular kind of connection between the nodes, which may result from an action that was performed by one of the nodes on the other node. Examples of such actions by a social networking system user include listing social networking system objects in a user profile, subscribing to or joining a social networking system group or fan page, sending a message to another social networking system user, making a purchase associated with a social networking system node, commenting on a content item, or reserving (RSVP) to an event.

One category of an edge in the social network is a page connection. The page connection is a connection between a user account and a social networking system page. The social networking system page is a portal for an entity to interact with the social networking system users. The social networking system page can represent an entity, a brand, an individual, a business, a group, an organization, or any combination of. The page connection can be used in advertisement, news feed, data collection, and a variety of other tasks.

The page connections made with traditional systems often represent an explicit approval for the connection from a social networking system user to the social networking system page. For example, a page connection is made when a social networking system user clicks on a "like" button of the social networking system page. This type of connection making may limit the richness of information connectivity with the social networking system.

SUMMARY

Embodiments of the invention generate and utilize implicit social graph connections in a social networking system communications. In one embodiment, an implicit social graph connection is determined from a social graph of a social networking system. The implicit social graph connection can be leveraged from one or more recorded user interactions. The user interactions can be received from a client device connected to the social networking system through a user account.

Although it has been illustrated as examples in the figures and the detailed description that the implicit social graph connection is between a user account and a social network page, it is understood that the techniques disclosed herein apply to an implicit social graph connection between any social graph object to any other social graph object.

For example, from the user interaction, a connection generation module can identify a user account and a social network object, such as a social network page, related to that user interaction. An implicit social graph connection can be added to the social graph based on the user account and the social network object identified. The implicit social graph connection can be generated in response to the determining of the user interaction, or in a parallel batch process by surveying the social graph. The connection generation module can also calculate an edge weight for the implicit social graph connection, where the edge weight determines a quantitative likelihood that the user may later choose to make an explicit connection with the social network object. Numerous examples of how the implicit social graph connection is identified by the user interaction are described below.

Further, in one embodiment, the social networking system includes a connection utilization module. The connection utilization module can utilize the implicit social graph connection to select specific content items to present to the client. The connection utilization module can select advertisement objects, news feed stories, widgets, personalization content, or any combination thereof based on the implicit social graph connection as well as the edge weight of the implicit social graph connection.

The social networking system may improve accuracy of personalization of content based on the disclosed mechanisms. For example, advertisements shown to the user account or friend accounts of the user account can be better personalized based on interactions related to certain social network objects. A friend account is another user account that is associated to the user account, where the association is established by mutual explicit confirmation. Accordingly, embodiments of the invention are discovered to improve upon personalization technology of social networking systems and improve reach of businesses having a social network object.

Some embodiments have other aspects, elements, features, and steps in addition to or in place of what is described above. These potential additions and replacements are described throughout the rest of the specification

BRIEF DESCRIPTION OF THE DRAWINGS

FIGS. 6A-6C are examples of a social graph illustrating derivation of an implicit social graph connection through a passive connection process.

Figure 1:
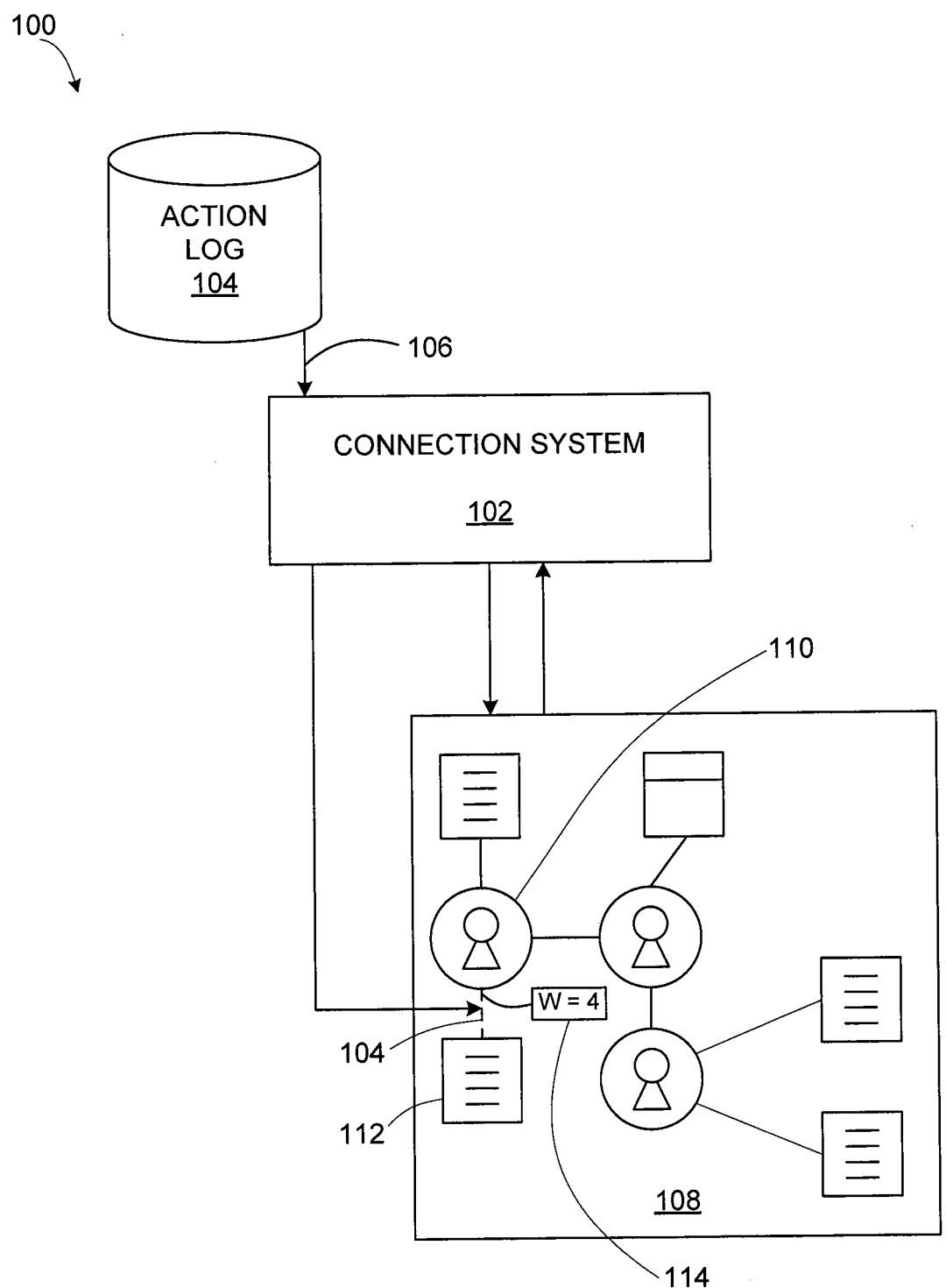
FIG. 1 is an illustration of a social networking system with a mechanism to generate implicit social graph connections.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Social Networking System Overview

Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph includes a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, such as a movie, a band, or a book. Content items include anything that a social networking system user or other object may create, upload, edit, or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or abstract idea.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may allow a user to upload or create pictures, videos, documents, songs, or other content items, and may allow a user to create and schedule events. Content items and events may be represented by nodes in the social graph.

A social networking system may provide a variety of means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

Social networking systems allow users to associate themselves and establish connections with other users of the social networking system. When two users explicitly establish a connection in the social networking system, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In one embodiment, users who belong to a common network are considered connected. For example, users who attend a common school, work for a common company, or belong to a common social networking system group may be considered connected. In one embodiment, users with common biographical characteristics are considered connected. For example, the geographic region users were born in or live in, the age of users, the gender of users and the relationship status of users may be used to determine whether users are connected. In one embodiment, users with common interests are considered connected. For example, users' movie preferences, music preferences, political views, religious views, or any other interest may be used to determine whether users are connected. In one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with a particular user in order to determine or evaluate the social context of the communications of the particular user, as will be described below in greater detail.

A social networking system may provide a variety of communication channels to users. For example, a social networking system may allow a user to email, instant message, or text/SMS message, one or more other users; may allow a user to post a message to the user's wall or profile or another user's wall or profile; may allow a user to post a message to a group or a fan page; or may allow a user to comment on an image, wall post or other content item created or uploaded by the user or another user. In one embodiment, a user posts a status message to the user's profile indicating a current event, state of mind, thought, feeling, activity, or any other present-time relevant communication. A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user.

An explicit social graph connection ("explicit connection") is defined as an intentional user interaction recorded for the purpose of making known on a social networking system that an association exists between an initiator and a target where the initiator is interested in further information about the target. The initiator and the target are social graph nodes. For example, a friend request from a "John Doe" to a "Jane Smith" is an explicit connection.

An explicit page connection is defined as an intentional user interaction recorded for the purpose of instructing the social networking system that an association exists between a user account and a target page, and that the user of the user account is interested in more information about the target page. For an explicit page connection, the initiator is a user account. The target in the case of an explicit page connection is a social networking system page. For example, a user "John Doe" liking a page for his favorite band "Morning Band" is an explicit page connection. For example, a user account commenting on a target page may be a direct and intentional interaction. The interaction does not establish an explicit page connection because the user account has not demonstrated that in explicit terms that the user account is interested in more information about the target page.

An implicit social graph connection ("implicit connection") is defined as any connection established by the social networking system for and between a user account and a target page that is not an explicit connection. Likewise, an implicit page connection is defined as any connection established by the social networking system for and between a user account and a target page that is not an explicit page connection. This disclosure describes methods and system mechanisms for generating and identifying these implicit social graph connections including implicit page connections.

Referring now to FIG. 1, therein is shown an illustration of a social networking system 100 with a mechanism to generate implicit social graph connections. The social networking system 100 can be a social networking system as described in the overview. The social networking system 100 can include a connection system 102 that operates within the social networking system 100 to generate an implicit social graph connection 104, such as an implicit page connection.

The social networking system 100 can provided the connection system 102 with a user interaction 106. The user interaction 106 can be received from a client device and recorded on the social networking system 100.

The social networking system 100 includes a social graph 108. The social graph 108 can be the social graph as described in the overview, containing connections between different node entities, such as user accounts, social network pages, interest groups, and other entities.

The connection system 102 retrieves the user interaction 106 and traverses through the social graph 108 to identify any potential new implicit social graph connections. The connection system 102 can identify a user account associated with the user interaction 106, such as a user account 110. The user account 110 can be the user account that initiated the user interaction 106. The user account 110 can also be directly involved in the user interaction 106. For example, if the user interaction 106 is a message post, the user account 110 can be an owner of a message wall where the message post is deposited. The user account 110 can also be indirectly involved in the user interaction 106, wherein the user account 110 is directly associated with another entity that is directly involved in the user interaction 106.

The connection system 102 can also identify a social network object 112 associated with the user interaction 106, such as a social network page. The social network object 112 can be the social network page involved in the user interaction 106. The social network object 112 may be identified also when a reference, a link, or a content of the social network object 112 is involved in the user interaction 106. For example, if a promotion, a coupon, a message, a multimedia shared post, or a gift from the social network object 112 is involved in the user interaction 106, the social network object 112 can be identified by the connection system 102. The social network object 112 may be identified when a reference, a link, or a content of the social network object 112 is indirectly involved in the user interaction 106. For example, if the user interaction 106 involves the user account 110 tagging a friend account in the photo, and the friend account has already referenced a link to the social network object 112 on the photo, then the social network object 112 may be identified by the connection system 102 as indirectly involved in the user interaction 106.

Once the connection system 102 has identified the user account 110 and the social network object 112, the connection system 102 can generate the implicit social graph connection 104. The implicit social graph connection 104 can be an implicit social graph connection, as previously defined, between a social network page and a user account, such as the social network object 112 and the user account 110 in the social graph 108. The implicit social graph connection 104 can be stored in a standalone database, or can be stored back to the social graph 108 of the social networking system 100.

The connection system 102 can calculate an edge weight 114 associated with the implicit social graph connection 104. The edge weight 114 is an indication of how likely the user of the user account 110 would confirm an explicit social graph connection with the social network object 112. The edge weight 114 can be based on the type of the user interaction 106. The edge weight 114 can also be based on whether the user account 110 initiated the user interaction 106, whether the user account 110 is directly involved in the user interaction 106, or whether the user account 110 is indirectly involved in the user interaction 106. The edge weight 114 can be based on the whether the social network object 112 is directly or indirectly involved in the user interaction 106. The edge weight 114 can also be adjusted based on subsequent, additional instances of the user interaction 106. In some embodiments, a first interaction associated with the user account 110 and the social network object 112 can generate an instance of the implicit social graph connection 104, and subsequent interactions of the same type associated with the same user account 110 and the same social network object 112 can then adjust the edge weight 114 of the implicit social graph connection 104. In other words, the frequency of instances of the user interaction 106 may impact the edge weight 114.

Figure 2:
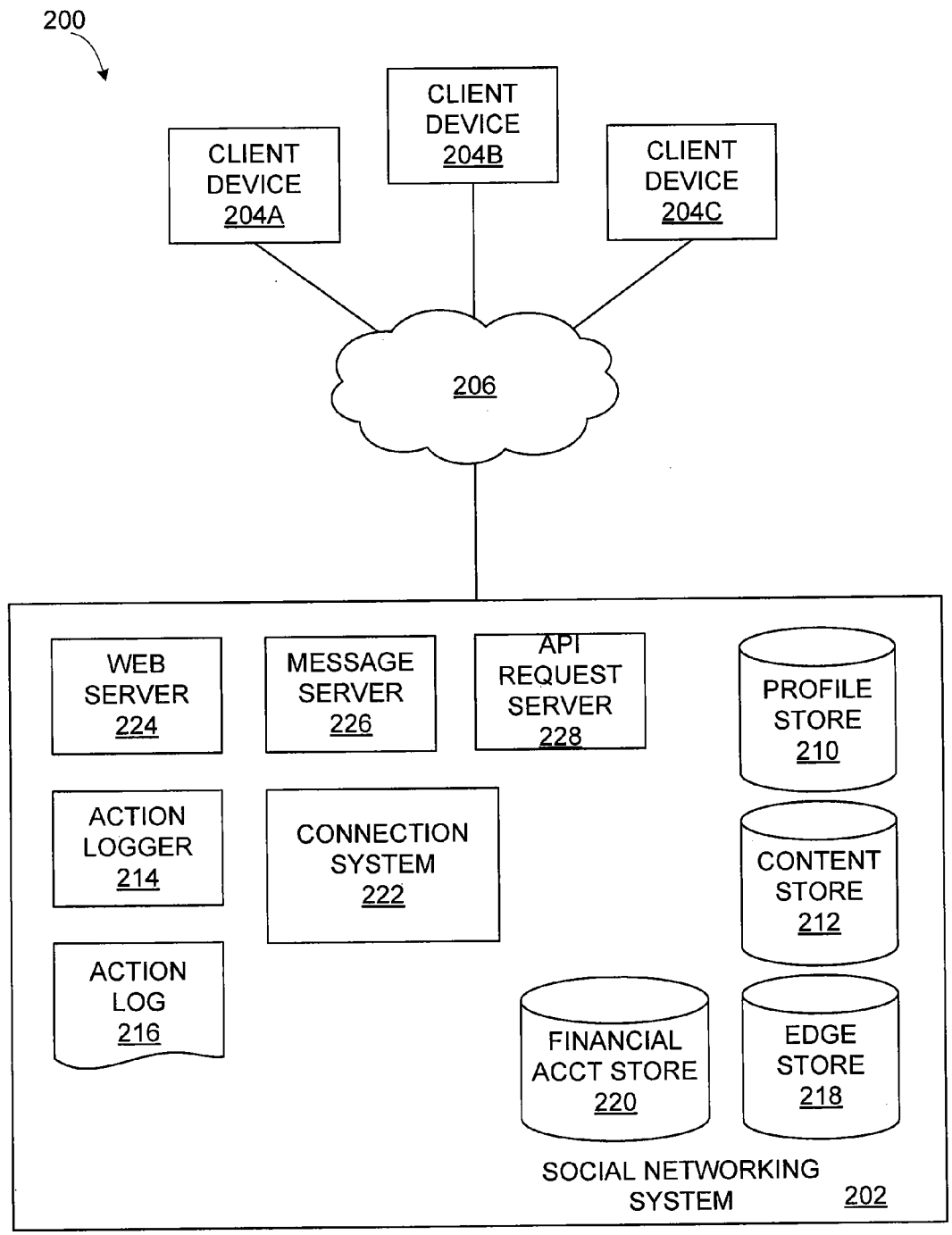
FIG. 2 is a high level block diagram of a system environment suitable for a social networking system, according to one embodiment.

Referring now to FIG. 2, therein is shown a high level block diagram of a system environment 200 suitable for a social networking system 202, according to one embodiment.

The system environment 200 shown in FIG. 2 includes the social networking system 202, a client device 204A, and a network channel 206. The system environment 200 can include other client devices as well, such as a client device 204B and a client device 204C. In other embodiments, the system environment 200 may include different and/or additional components than those shown by FIG. 2. The social networking system 202 can be the social networking system 100 of FIG. 1.

Social Networking System Environment and Architecture

The social networking system 202, further described below, comprises one or more computing devices storing user profiles associated with users and/or other objects as well as connections between users and other users and/or objects. In use, users join the social networking system 202 and then add connections to other users or objects of the social networking system to which they desire to be connected. As further described below in conjunction with FIG. 2, users of the social networking system 202 may be individuals or entities such as businesses, organizations, universities, manufacturers. The social networking system 202 allows its users to interact with each other as well as with other objects maintained by the social networking system 202. In some embodiments, the social networking system 202 allows users to interact with third-party websites and a financial account provider.

Based on stored data about users, objects and connections between users and/or objects, the social networking system 202 generates and maintains a "social graph" comprising a plurality of nodes interconnected by a plurality of edges. This social graph can be the social graph 108 of FIG. 1. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 202 adds and/or modifies edges connecting the various nodes to reflect the interactions.

The client device 204A is a computing device capable of receiving user input as well as transmitting and/or receiving data via the network channel 206. In one embodiment, the client device 204A is a conventional computer system, such as a desktop or laptop computer. In another embodiment, the client device 204A may be a device having computer functionality, such as a personal digital assistant (PDA), mobile telephone, a tablet, a smart-phone or similar device. In yet another embodiment, the client device 204A can be a virtualized desktop running on a cloud computing service. The client device 204A is configured to communicate with the social networking system 202, and/or the financial account provider via the network channel 206. In one embodiment, the client device 204A executes an application allowing a user of the client device 204A to interact with the social networking system 202. For example, the client device 204A executes a browser application to enable interaction between the client device 204A and the social networking system 202 via the network channel 206. In another embodiment, a the client device 204A interacts with the social networking system 202 through an application programming interface (API) that runs on the native operating system of the client device 204A, such as MS® or ANDROID™.

The client device 204A is configured to communicate via the network channel 206, which may comprise any combination of local area and/or wide area networks, using both wired and wireless communication systems. In one embodiment, the network channel 206 uses standard communications technologies and/or protocols. Thus, the network channel 206 may include links using technologies such as Ethernet, 802.11, worldwide interoperability for microwave access (WiMAX), 3G, 4G, CDMA, digital subscriber line (DSL), etc. Similarly, the networking protocols used on the network channel 206 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 206 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 202 shown by FIG. 2 includes a profile store 210, a content store 212, an action logger 214, an action log 216, an edge store 218, a financial account store 220, a connection system 222, a web server 224, a message server 226, and an API request server 228. In other embodiments, the social networking system 202 may include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 202 is associated with a user profile, which is stored in the profile store 210. A user profile includes declarative information about the user that was explicitly shared by the user, and may also include profile information inferred by the social networking system 202. In one embodiment, a user profile includes multiple data fields, each data field describing one or more attributes of the corresponding user of the social networking system 202. The user profile information stored in the profile store 210 describes the users of the social networking system 104, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 202 displayed in an image. A user profile in the profile store 210 may also maintain references to actions by the corresponding user performed on content items in the content store 212 and stored in the edge store 218.

As further described below, a user profile may be associated with one or more financial accounts, allowing the user profile to include data retrieved from or derived from a financial account. A user may specify one or more privacy settings, which are stored in the user profile, that limit information from a financial account that the social networking system 202 is permitted to access. For example, a privacy setting limits the social networking system 202 to accessing the transaction history of the financial account and not the current account balance. As another example, a privacy setting limits the social networking system 202 to a subset of the transaction history of the financial account, allowing the social networking system 202 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 202. In one embodiment, information from the financial account is stored in the profile store 210. In other embodiments, it may be stored in the financial account store 220.

The content store 212 stores content items associated with a user profile, such as images, videos or audio files. Content items from the content store 212 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 202. Examples of social networking content items include suggested connections or suggestions to perform other actions, media provided to, or maintained by, the social networking system 202 (e.g., pictures or videos), status messages or links posted by users to the social networking system, events, groups, pages (e.g., representing an organization or commercial entity), and any other content provided by, or accessible via, the social networking system.

The content store 212 also includes one or more pages associated with entities having user profiles in the profile store 210. An entity is a non-individual user of the social networking system 202, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 212, allowing social networking system users to more easily interact with the vendor via the social networking system 202. A vendor identifier is associated with a vendor's page, allowing the social networking system 202 to identify the vendor and/or to retrieve additional information about the vendor from the profile store 210, the action log 216 or from any other suitable source using the vendor identifier. In some embodiments, the content store 212 may also store one or more targeting criteria associated with stored objects and identifying one or more characteristics of a user to which the object is eligible to be presented.

The action logger 214 receives communications about user actions on and/or off the social networking system 202, populating the action log 216 with information about user actions. Such actions may include, for example, adding a connection to another user, sending a message to another user, uploading an image, reading a message from another user, viewing content associated with another user, attending an event posted by another user, among others. In some embodiments, the action logger 214 receives, subject to one or more privacy settings, transaction information from a financial account associated with a user and identifies user actions from the transaction information. For example, the action logger 214 retrieves vendor identifiers from the financial account's transaction history and identifies an object, such as a page, in the social networking system associated with the vendor identifier. This allows the action logger 214 to identify a user's purchases of products or services that are associated with a page, or another object, in the content store 212. In addition, a number of actions described in connection with other objects are directed at particular users, so these actions are associated with those users as well. These actions are stored in the action log 216.

In accordance with various embodiments, the action logger 214 is capable of receiving communications from the web server 224 about user actions on and/or off the social networking system 200. The action logger 214 populates the action log 216 with information about user actions to track them. This information may be subject to privacy settings associated with the user. Any action that a particular user takes with respect to another user is associated with each user's profile, through information maintained in a database or other data repository, such as the action log 216. Such actions may include, for example, adding a connection to the other user, sending a message to the other user, reading a message from the other user, viewing content associated with the other user, attending an event posted by another user, being tagged in photos with another user, liking an entity, etc.

The action log 216 may be used by the social networking system 202 to track user actions on the social networking system 202, as well as external website that communicate information to the social networking system 202. Users may interact with various objects on the social networking system 202, including commenting on posts, sharing links, and checking-in to physical locations via a mobile device, accessing content items in a sequence or other interactions. Information describing these actions is stored in the action log 216. Additional examples of interactions with objects on the social networking system 202 included in the action log 216 include commenting on a photo album, communications between users, becoming a fan of a musician, adding an event to a calendar, joining a groups, becoming a fan of a brand page, creating an event, authorizing an application, using an application and engaging in a transaction. Additionally, the action log 216 records a user's interactions with advertisements on the social networking system 202 as well as applications operating on the social networking system 202. In some embodiments, data from the action log 216 is used to infer interests or preferences of the user, augmenting the interests included in the user profile and allowing a more complete understanding of user preferences.

Further, user actions that happened in particular context, such as when the user was shown or was seen accessing particular content on the social networking system 200, are captured along with the particular context and logged. For example, a particular user could be shown/not-shown information regarding candidate users every time the particular user accessed the social networking system 200 for a fixed period of time. Any actions taken by the user during this period of time are logged along with the context information (i.e., candidate users were provided/not provided to the particular user) and are recorded in the action log 216. In addition, a number of actions described below in connection with other objects are directed at particular users, so these actions are associated with those users as well.

The action log 216 may also store user actions taken on external websites and/or determined from a financial account associated with the user. For example, an e-commerce website that primarily sells sporting equipment at bargain prices may recognize a user of the social networking system 202 through social plug-ins that enable the e-commerce website to identify the user of the social networking system 202. Because users of the social networking system 202 are uniquely identifiable, e-commerce websites, such as this sporting equipment retailer, may use the information about these users as they visit their websites. The action log 216 records data about these users, including webpage viewing histories, advertisements that were engaged, purchases made, and other patterns from shopping and buying. Actions identified by the action logger 214 from the transaction history of a financial account associated with the user allow the action log 216 to record further information about additional types of user actions.

In one embodiment, the edge store 218 stores the information describing connections between users and other objects on the social networking system 202 in edge objects. The edge store 218 can store the social graph described above, such as the social graph 108 of FIG. 1. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 202, such as expressing interest in a page on the social networking system, sharing a link with other users of the social networking system, and commenting on posts made by other users of the social networking system. The edge store 218 stores edge objects that include information about the edge, such as affinity scores for objects, interests, and other users. Affinity scores may be computed by the social networking system 202 over time to approximate a user's affinity for an object, interest, and other users in the social networking system 202 based on the actions performed by the user. Multiple interactions of the same type between a user and a specific object may be stored in one edge object in the edge store 218, in one embodiment. In some embodiments, connections between users may be stored in the profile store 210, or the profile store 210 may access the edge store 218 to determine connections between users. Users may select from predefined types of connections, or define their own connection types as needed.

The web server 224 links the social networking system 200 via a network to one or more client devices; the web server 224 serves web pages, as well as other web-related content, such as Java, Flash, XML, and so forth. The web server 224 may communicate with the message server 226 that provides the functionality of receiving and routing messages between the social networking system 200 and client devices. The messages processed by the message server 226 can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 228 allows external systems to access information from the social networking system 200 by calling APIs. The information provided by the social network may include user profile information or the connection information of users as determined by their individual privacy settings. For example, a system interested in predicting the probability of users forming a connection within a social networking system may send an API request to the social networking system 200 via a network. The API request is received at the social networking system 200 by the API request server 228. The API request server 228 processes the request by determining the appropriate response, which is then communicated back to the requesting system via a network.

The social networking system 202 also includes the connection system 222. The connection system 222 can be the connection system 102 of FIG. 1. The connection system 222 can access the stores and modules of the social networking system 202 in order to determine new implicit social graph connections. The connection system 222 can receive user interactions from the client device 204A for determining potential new implicit social graph connections. As implicit social graph connections are generated and stored, the connection system 222 can also work with other modules and stores of the social networking system 202 to utilize the implicit social graph connections to select contents to display to the client device 204A.

Figure 3:
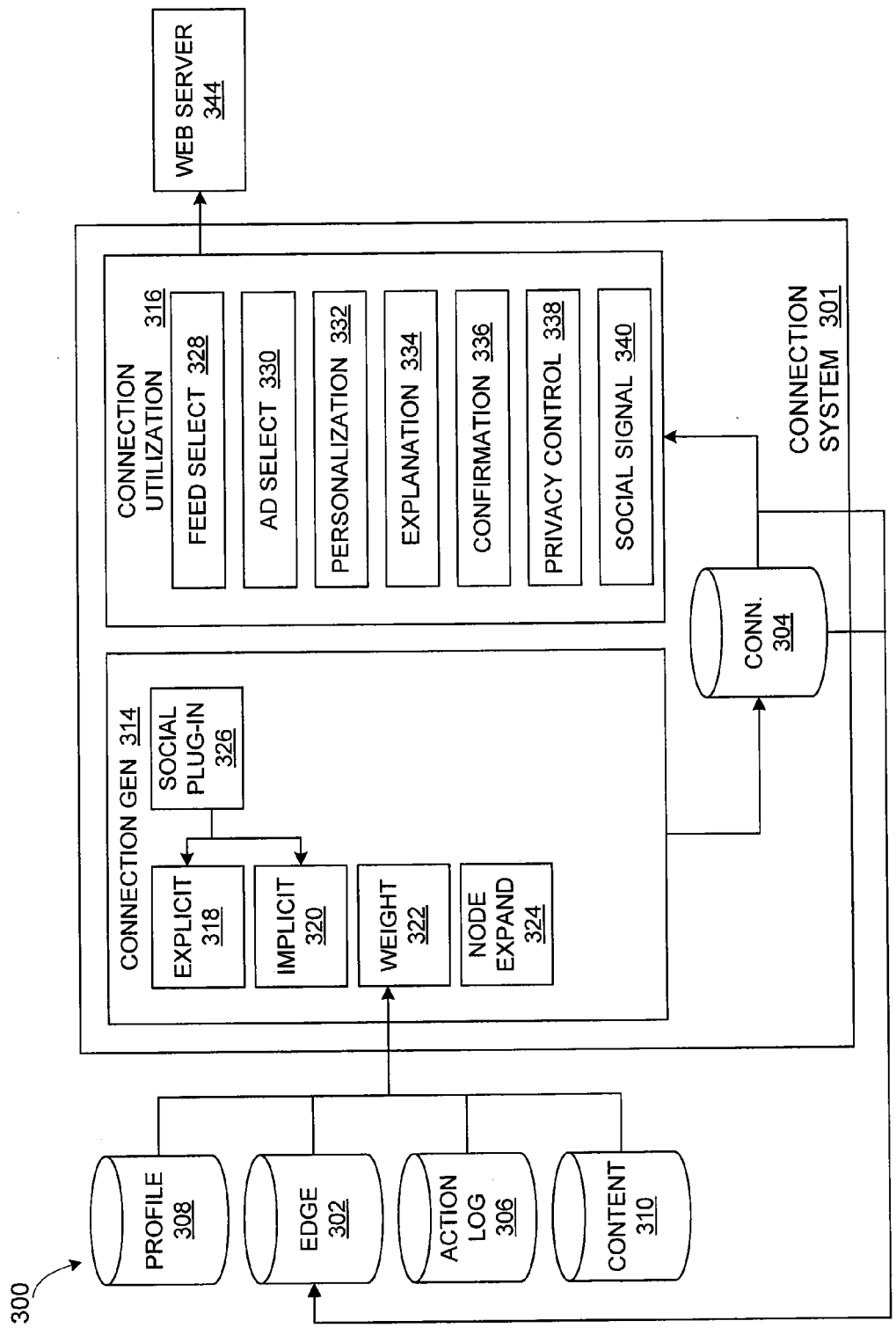
FIG. 3 is a control flow of a social networking system operating a connection system.

Referring now to FIG. 3, therein is shown a control flow of a social networking system 300 operating a connection system 301. The connection system 301 can be the connection system 102 of FIG. 1 or the connection system 222 of FIG. 2. The connection system 301 is for determining an implicit social graph connection from at least a social graph, such as the social graph 108 of FIG. 1. The implicit social graph connection can in turn be stored back into the social graph, such as in an edge store 302 or a connection store 304. For example, the connection system 301 can determine an implicit social graph connection from the social graph represented by the edge store 302. The edge store 302 can be the edge store 218 of FIG. 2. The connection system 301 can also access user interactions from an action log 306, user profiles from a profile store 308, and social network contents from a content store 310, such as the action log 216 of FIG. 2, the profile store 210 of FIG. 2, and the content store 212 of FIG. 2.

The connection system 301 can be implemented by a computer system with at least one processor and one non-transitory memory. The connection system 301 can also be on the same computer system as the social networking system 100 of FIG. 1 or the social networking system 202 of FIG. 2. The connection system 301 can be implemented by a computer system of FIG. 10.

The connection system 301 can include one or more methods of determining the implicit social graph connection from a user interaction and/or a social graph of the social networking system 300, such as the social networking system 100 of FIG. 1. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 10.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The storages or "stores", described below are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The connection system 301 can include additional, fewer, or different modules for various applications. Conventional components such as network interfaces, security functions, load balancers, failover servers, management and network operations consoles, and the like are not shown so as to not obscure the details of the system.

The connection system 301 includes two main modules, a connection generation module 314 and a connection utilization module 316. The connection generation module 314 is for generating an implicit social graph connection. The connection utilization module 316 is for selecting one or more content entries for presenting to a user account based on the implicit social graph connection.

The connection generation module 314 includes an explicit connection generation module 318. The explicit connection generation module 318 is for generating and storing an explicit social graph connection. The explicit connection generation module 318 can access a user interaction that indicates an explicit social graph connection. For example, the explicit connection generation module 318 can identify a "like" or a "subscribe" action from the action log 306. The "like" or the "subscribe" action indicates directly and explicitly that a user account, such as the user account 110 of FIG. 1, is interested in receiving further information from a social network page, such as the social network object 112 of FIG. 1. The explicit connection generation module 318 can generate the explicit social graph connection between the user account and the social network page. The explicit connection generation module 318 can then store the generated social graph connection in the edge store 302 or the connection store 304.

The connection generation module 314 includes an implicit connection generation module 320. The implicit connection generation module 320 is for generating and storing an implicit social graph connection. The implicit connection generation module 320 can access a user interaction from the action log 306 that indicates an implicit social graph connection. The implicit connection generation module 320 can generate the implicit social graph connection by identifying a user account from the user interaction and identifying a social network page from the user interaction. Identifying the user account can include identifying the user account that initiated the user interaction. Identifying the user account can also include identifying the user account involved in the user interaction, either directly or indirectly as described in FIG. 1. Identifying the user account can include identifying that the user account shares one or more attributes that are the same as a different user account, where the different user account is involved in the user interaction. For example, the user account can be at the same location and at the same time as other user accounts that have made explicit social graph connections with the social network page. For another example, the user account can be part of an event, where most other user accounts in the event have checked-in to the social network page.

Identifying the social network page can include identifying the social network page by identifying a link, a reference, or a content of the social network page involved in the user interaction. This involvement again can be a direct involvement or an indirect involvement as described in FIG. 1.

The implicit connection generation module 320 can be based on a laundry list of user interaction types. The laundry list of user interaction types can be used to compare to the incoming user interactions to determine whether an implicit social graph connection should be generated.

The connection generation module 314 includes a weight calculation module 322. The weight calculation module 322 is for determining an edge weight of the social graph connection generated by the implicit connection generation module 320 or the explicit connection generation module 318. For example, the social graph connection can be between a user account and a social network page. The edge weight can be the edge weight 114 of FIG. 1. The edge weight can represent a prediction of a quantitative likelihood that the user may later choose to make an explicit connection with the social network page. An explicit connection always has the highest likelihood value as represented by the edge weight. The weight calculation module 322 can determine the edge weight based on a number of factors, adjusting the edge weights to be proportional to the strength of the implicit social graph connection.

For example, the weight calculation module 322 can determine the edge weight based on a first location record of the user account and a second location record of the social network page. The weight calculation module 322 can give more weight to the generated implicit social graph connection as the user account residence or current location is closer to the physical location of an entity behind the social network page.

For another example, the weight calculation module 322 can be an iterative process. The weight calculation module 322 can first determine the edge weight of a newly generated implicit social graph connection. As new user interactions are received by the weight calculation module 322, the weight calculation module 322 can adjust the edge weight based on the new user interactions. For example, a user interaction (e.g., a check-in action associated with a page in the social network) by the user can generate an implicit social graph connection with an edge weight. A subsequent interaction (e.g., another check-in action associated with the same page) by the user can increase the weight of the edge between the user account and the social network page. The edge weight in turn can be based on a history of user interactions associated with the user account and the social network page. This enables capturing of the frequency of user interactions with the social network page either directly or indirectly. This adjustment of the edge weight can occur for the same type of interaction. In some embodiments, this adjustment of the edge weight can occur for different types of interactions that are related to the same user account and the same social network object. The frequency of user interaction has been found to be proportional to the likelihood a user may establish an explicit connection later. Hence, the edge weight can be adjusted based on additional interactions, e.g. increasing the edge weight proportionally for each additional interaction.

For yet another example, the weight calculation module 322 can determine the edge weight based on an account profile of the user account. The account profile can be retrieved from the profile store 308. In yet another example, the weight calculation module 322 can determine the edge weight based on a page profile of the social network page. The page profile can be retrieved from the profile store 308. The page profile can include a business entity type. For example, the page profile of the social network page can include that the social network page is a museum or is a restaurant. When the entity type is a museum as compared to a restaurant, the edge weight may be higher given the same frequency of user interactions between the user account and the social network page. This allows the system to recognize strong associations for business entity types that do not frequently expose themselves to user interaction.

In a further example, the weight calculation module 322 can determine the edge weight based on an edge weight model. The edge weight model can be a function of the user interactions responsible for generating the implicit social graph connection. The edge weight model can be a function of a frequency of user interactions between the user account of the implicit social graph connection and the social network page of the implicit social graph connection. For a specific example, the edge weight model may be that if the user account gets tagged at or checks-in at the social network page once in a month, the edge weight is 1. The edge weight model may be that if the user account checks-in twice to the social network page in the month, the edge weight is 5. When the user account checks-in three times in the month the edge weight can be 20. The edge weight model can be a non-linear function of frequency of user interaction.

The edge weight model can be generated or trained based on explicit social graph connections in the social graph. The edge weight model can be specific to a page type and a user account type in the social graph. When a particular type of user interaction of the social graph yields more explicit connections, the edge weight model will recognize that the particular type of user interaction and the social graph layout as corresponding to a high edge weight value.

In one embodiment, the edge weight model can be based on various other types of user interactions. A specific edge weight function can be assigned to each of the user interaction types. The specific edge weight function can be based on user profile attributes, page profile attributes, frequency of the user interactions, or any combination thereof.

Once the social graph connection is generated by the implicit connection generation module 320 or the explicit connection generation module 318, the social graph connection can be stored back into the edge store 302 or the connection store 304. The edge weight of each of the social graph connections can also be stored in the edge store 302 or the connection store 304.

The connection generation module 314 can include a node expansion module 324. The node expansion module 324 is for generating new implicit social graph connections by collapsing a chain of associations in a social graph between a user account node and a social network page node into a direct connection between the user account and the social network page. For example, if a user account is associated with a friend account, and the friend account is explicitly subscribed to the social network page, then the node expansion module 324 can generate an implicit social graph connection between the user account and the social network page.

The connection generation module 314 can include a social plug-in module 326. The social plug-in module 326 is for receiving user interactions from a social plug-in instead of the action log 306. The social plug-in is a tool that another website can use to provide people with personalized and social experience. When an external user account of the another website interact with the social plug-in, the external user account share the external user experiences off of the social networking system 300 with user accounts on the social networking system 300. The social plug-in can include a user interface for interacting with contents within the social networking system 300. For example, the social plug-in module 326 can receive and provide the user interaction 106 of FIG. 1 for the connection generation module 314. In a specific example, an external user account can be logged into Spotify™, and the external user account may be listening to a lot of songs from "David Bowie." In that specific example, the social plug-in module 326 can provide the user interaction of listening to songs from the social network page for "David Bowie" to the connection generation module 314.

The connection utilization module 316 includes a feed selection module 328. The feed selection module 328 is for presenting news feed stories to a user of the social networking system 300, based on the social graph. The newsfeed is made up of one or more news stories, and each story contains one or more items of media content. The feed selection module 328 can select one or more generated stories for the news feed based, at least in part, on the edge weights of implicit social graph connections.

In one embodiment, the feed selection module 328 can use the implicit social graph connections to select news feed stories. In other embodiments, the implicit social graph connections can be used to select other media contents for presentation to the user as well. For example, the implicit social graph connections can be used to select social network page suggestions, mobile notifications, friend account suggestions, or purchase suggestions, in the same manner as how the news feed stories are selected.

The feed selection module 328 can present a news feed story regarding a social network page when an implicit social graph connection exists between the user account and the social network page. The feed selection module 328 can also present the news feed story regarding the social network page when an implicit social graph connection exists between a friend account of the user account and the social network page.

In one embodiment, when selecting the news feed based on the edge weight, lower value edge weight corresponds to higher quality content entries selected for the news feed. Quality of the content entries can be determined by the social networking system 300. For example, quality can be based on the number of interactions with the content entries from other user accounts in the social networking system 300. Sponsored contents can also be considered of a higher quality. For high value edge weight, more content entries of the social network page are eligible to show up on a user's news feed story.

The feed selection module 328 can select one or more content entries of the social network page connected by the implicit social graph connection for presentation to the user account when the content entries are sponsored content. The feed selection module 328 can select one or more content entries of the social network page for presentation to the user account when the social network page is established by a sponsor client.

The connection utilization module 316 includes an advertisement selection module 330. The advertisement selection module 330 is for presenting targeted advertisement to the user account based on the explicit and implicit social graph connections of the user account. The advertisement selection module 330 can select one or more advertisement objects of the social network page for presentation to the user account when the social network page is established by a sponsor client. The advertisement selection module 330 can select one or more advertisement objects for displaying to a user device signed-in under the user account based on the edge weights of implicit social graph connections.

The advertisement selection module 330 can present an advertisement object regarding a social network page when an implicit social graph connection exists between the user account and the social network page. The advertisement selection module 330 can also present the advertisement object regarding the social network page when an implicit social graph connection exists between a friend account of the user account and the social network page.

In one embodiment, when selecting the advertisement objects based on the edge weight, lower value edge weight corresponds to higher quality advertisement objects selected. Quality of the advertisement object can be determined by the social networking system 300. For example, quality can be based on the number of interactions with the advertisement object from user accounts in the social networking system 300. Quality can also be proportional to amount of sponsorship paid to the social networking system 300. For high value edge weight, more advertisement objects of the social network page are eligible to be presented to the user account.

The connection utilization module 316 includes a personalization module 332. The personalization module 332 is for determining a layout of a user portal of a user account of the social networking system 300 based on social graph connections. The personalization module 332 can determine the layout by sorting content entries to present or display to the user account. Each of the content entry may have been selected based on a social graph connection, the social graph connection having an edge weight as determined by the weight calculation module 322. The sorting of content entries can be based on the edge weight of the social graph connection of each of the content entries. The highest strength associations can be sorted to be displayed to the user account first, such as a content entry based on an explicit social graph connection. Weaker strength associations can be sorted to be displayed later, such as a content entry based on a weak implicit social graph connection.

The connection utilization module 316 can include an explanation module 334. The explanation module 334 is for generating an origination explanation for the content entry selected for displaying. The origination explanation is an indication that the user interaction is what triggered the selecting of the content entry. For example, if the user interaction is the user account sharing a coupon of the social network page, then when the content entry is selected for the news feed, the content entry is accompanied by the origination explanation that the content entry is selected based the sharing of the coupon of the social network page.

The connection utilization module 316 can include a confirmation module 336. The confirmation module 336 is for generating a confirmation request to the user account based on the implicit social graph connection generated. The confirmation request is for converting the implicit social graph connection to an explicit social graph connection by providing the user account an opportunity to actively subscribe to the social network page. When a content entry is selected for displaying by the connection utilization module 316, the confirmation request can accompany the content entry whenever and wherever it is displayed. The confirmation request can accompany the origination explanation in the display of the content entries selected by the connection utilization module 316. For example, the confirmation request can be a user interface to request a user to "like" a social network page, when the connection generation module 314 has generated an implicit social graph connection between the user account and the social network page.

The connection utilization module 316 includes a privacy control module 338. The privacy control module 338 is for providing user control over privacy use of the implicit social graph connections. For example, a user account can choose not to display any personalized content entry selected based on an implicit social graph connection. Users can mark selected content entries as spam or as content the user is not interested. The user may also configure the user account such that no or limited amount of implicit social graph connections are generated based on user interactions of that user account.

The connection utilization module 316 can include a social signal module 340. The social signal module 340 is for presenting social graph connections of a user account to a friend account of the user account. For example, the social signal module 340 can present an advertisement of the social network page to the friend account. The social signal module 340 can indicate that the advertisement is being displayed because there exists an explicit social graph connection between the user account and the social network page. The social signal module 340 can also indicate that the advertisement is being displayed because the social network page is socially relevant from an implicit social graph connection. The social signal module 340 can present social distribution information regarding the social network page in advertisements and contents presented without explicit attribution to the user account that is implicitly associated with the social network page.

The page utilization module 316 can send the selected content entries from its modules to a web server 344 for presentation to the client devices of the social networking system 300. The web server 344 can be the web server 224 of FIG. 2. The client devices can be the client device 204A of FIG. 2.

The techniques introduced in the modules above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 4A:
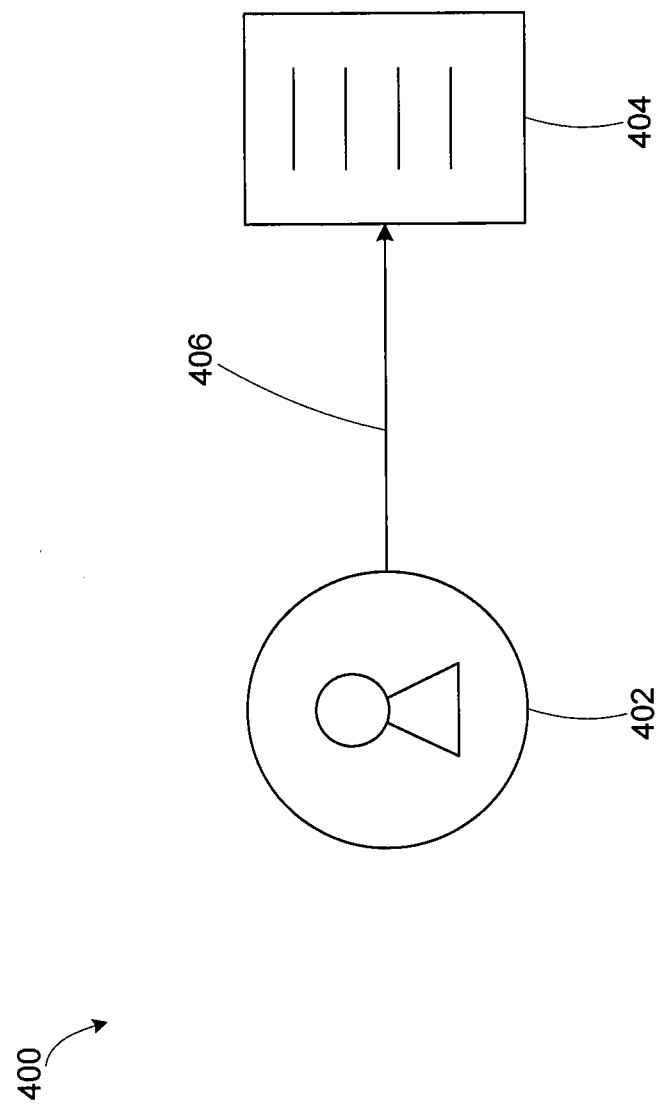
FIGS. 4A-4B are examples of a social graph illustrating derivation of an implicit social graph connection through a direct interaction process.
Figure 4B:
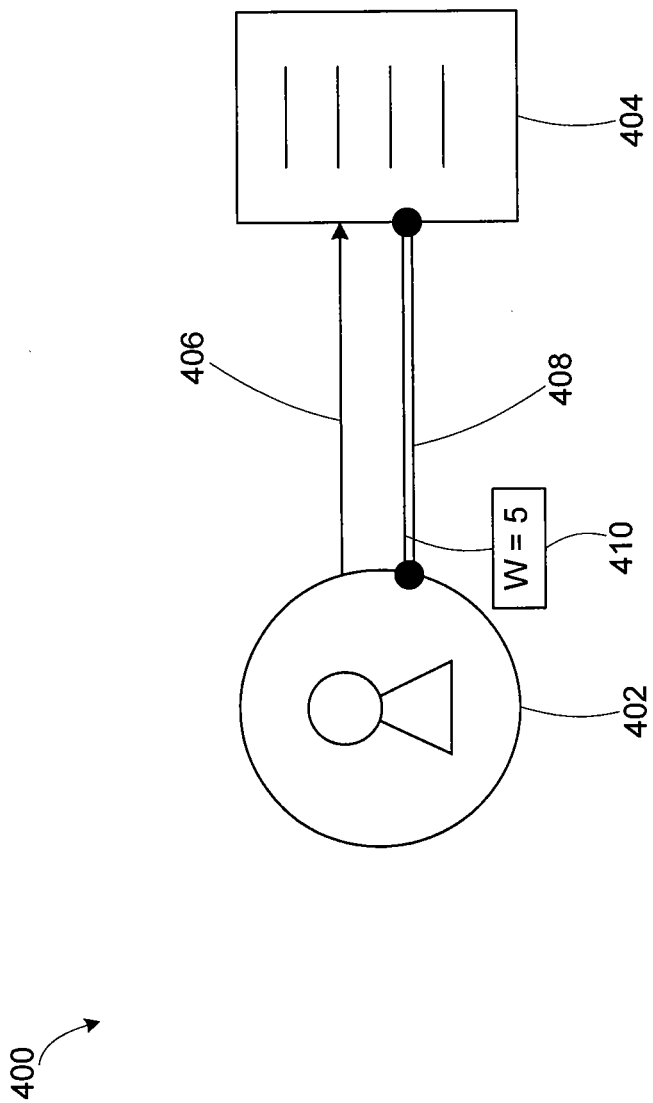

Referring now to FIGS. 4A-4B, therein are shown examples of a social graph 400 illustrating derivation of an implicit social graph connection through a direct interaction process, based on a direct interaction that is not an explicit indication of interest in the social object/page. FIG. 4A illustrates the social graph 400 prior to generating the implicit social graph connection. The implicit social graph connection can be an implicit page connection. The social graph 400 includes a user account 402 connected to a social network page 404 via a trigger action 406. The trigger action 406 is defined as a triggering user interaction that signifies a potential existence of an implicit social graph connection.

For example, the trigger action 406 can be a communication action to the social network page 404 or a reference action to the social network page 404. The communication action is a user interaction based on a user communication to other social objects of a social networking system. As specific examples, the trigger action 406 can be sending of a message to the social network page 404, commenting on a wall of the social network page 404, or answering a poll on the social network page 404. The reference action is a user interaction where the user references another entity in the social networking system. As specific examples, the trigger action 406 can be mentioning the social network page 404 in a post, checking-in to the social network page 404, adding a geo-tag referencing the social network page 404, or sharing the social network page 404 on a user wall.

FIG. 4B illustrates the social graph 400 after an implicit social graph connection 408 is determined and added onto the social graph 400. The implicit social graph connection 408 connects the user account 402 and the social network page 404 to indicate a likelihood of the user account 402 being interested in contents of the social network page 404. The implicit social graph connection 408 is determined by a connection generation module, such as the connection generation module 314 of FIG. 3. The implicit social graph connection 408 can include an edge weight 410. For example, the edge weight 410 can be the edge weight 114 of FIG. 1, generated by the weight calculation module 322 of FIG. 3.

Figure 5A:
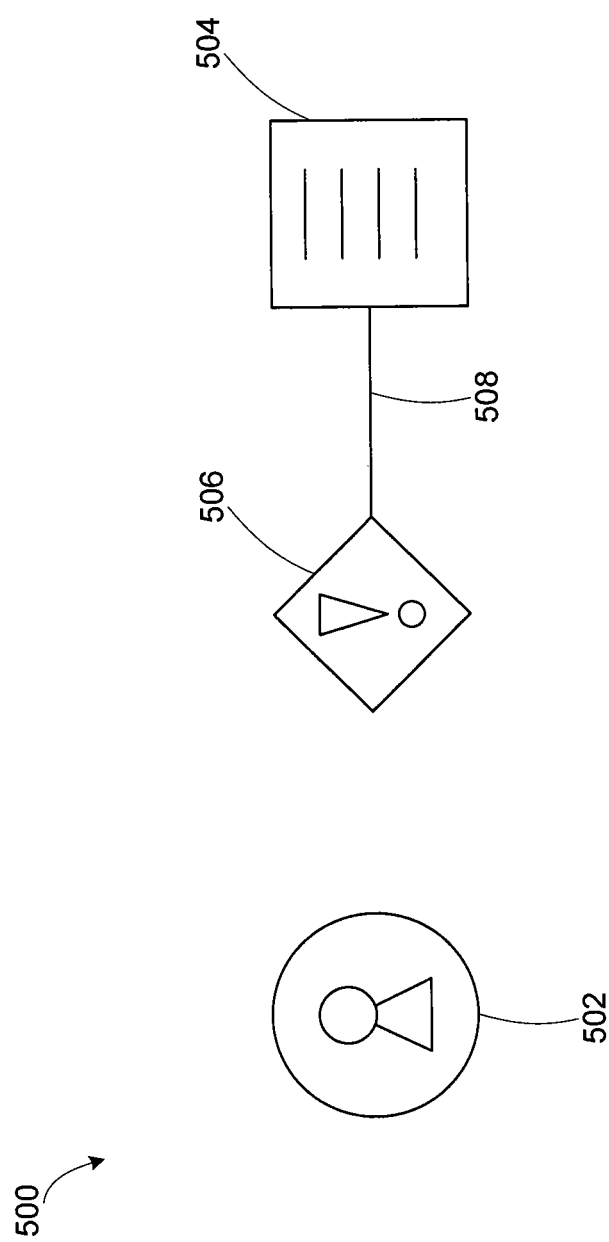
FIGS. 5A-5C are examples of a social graph illustrating derivation of an implicit social graph connection through a proactive reach process.
Figure 5B:
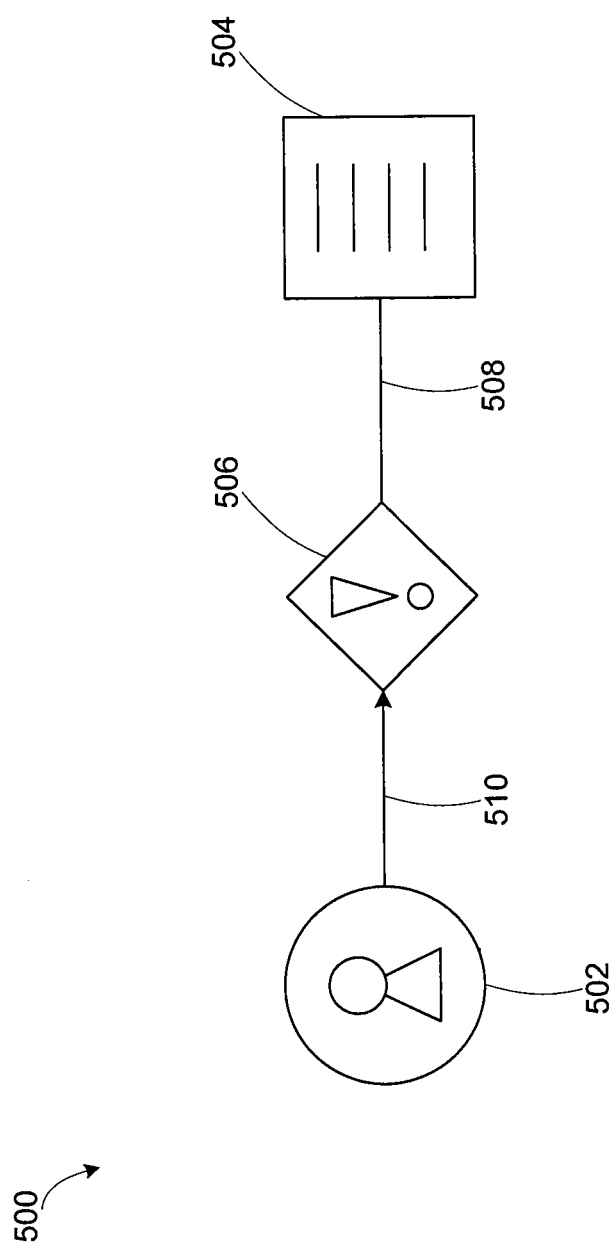
Figure 5C:
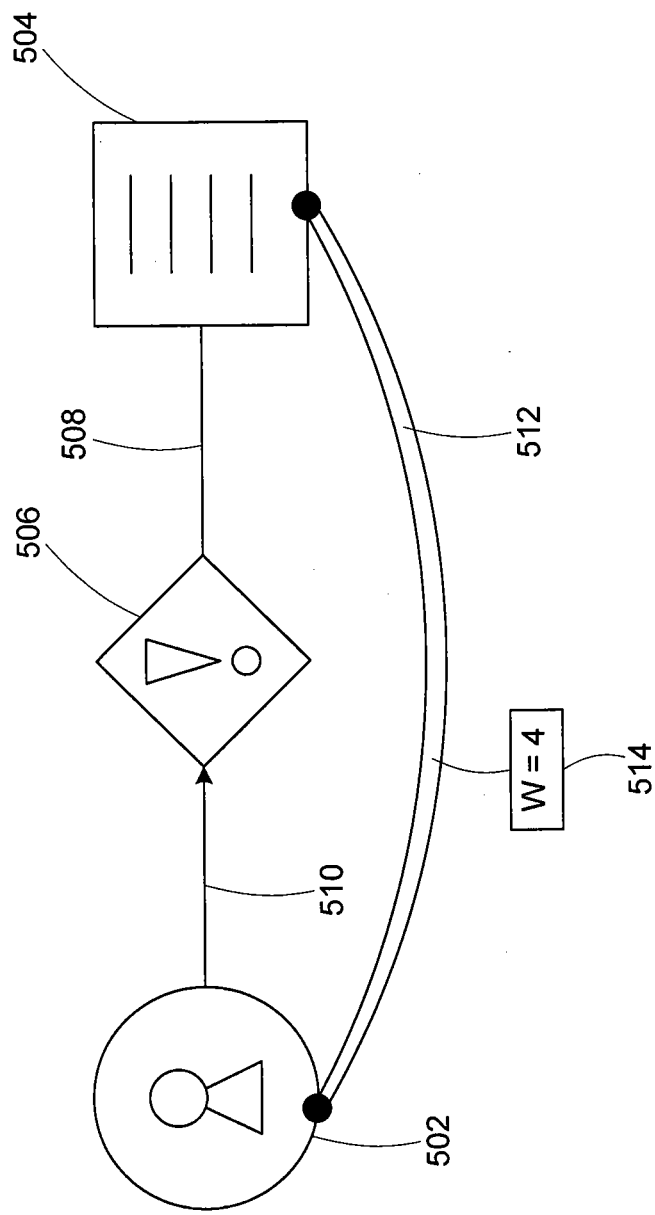

Referring now to FIGS. 5A-5C, therein are shown examples of a social graph 500 illustrating derivation of an implicit social graph connection through a proactive reach process, based on an interaction with a content item of the social object. FIG. 5A illustrates an initial state of the social graph 500. The implicit social graph connection can be an implicit page connection. The social graph 500 includes a user account 502. The social graph 500 also includes a social network page 504. The social network page 504 is linked to a page item 506 via a content association 508. The page item 506 is a content, a widget, or an interactive multimedia of the social network page 504. The content association 508 indicates that the page item 506 is specific to the social network page 504. For example, the page item 506 can be a promotion, a poll, a survey question, an event, a coupon, a content post, or any combination thereof.

FIG. 5B illustrates the social graph 500 after recordation of a trigger action 510 and prior to adding an implicit social graph connection 512. The trigger action 510 is a triggering user interaction that signifies a potential existence of an implicit social graph connection. The trigger action 510 can be an activation action or a reference action. The activation action is a user interaction for activating a function or a widget of the page item 506. For example, the trigger action 510 can be claiming a promotion, RSVPing to an event, or responding to a survey poll. For another example, the trigger action 510 can be sharing a content post or a promotion coupon.

FIG. 5C illustrates the social graph 500 after the implicit social graph connection 512 is determined and added onto the social graph 500. The implicit social graph connection 512 is determined by a connection generation module, such as the connection generation module 314 of FIG. 3. The implicit social graph connection 512 connects the user account 502 and the social network page 504 to indicate a likelihood of the user account 502 being interested in contents of the social network page 504. The implicit social graph connection 512 can include an edge weight 514. For example, the edge weight 514 can be the edge weight 114 of FIG. 1, generated by the weight calculation module 322 of FIG. 3. In some embodiments, the edge weight 514 can have a value lower than the edge weight 410 of FIG. 4.

Figure 6B:
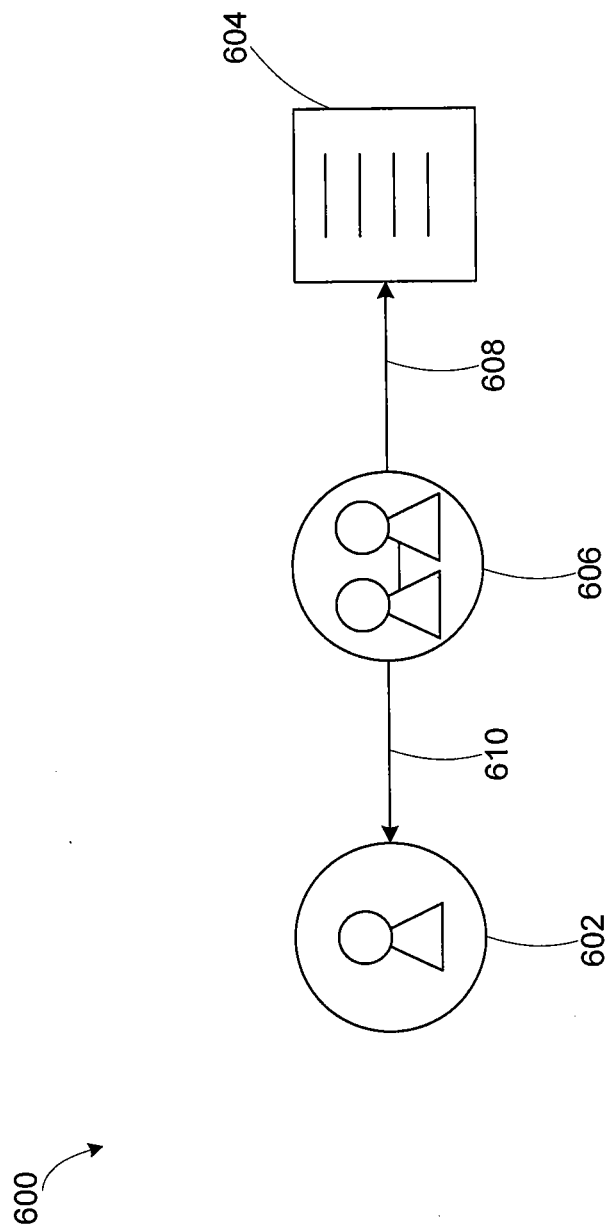
Figure 6C:
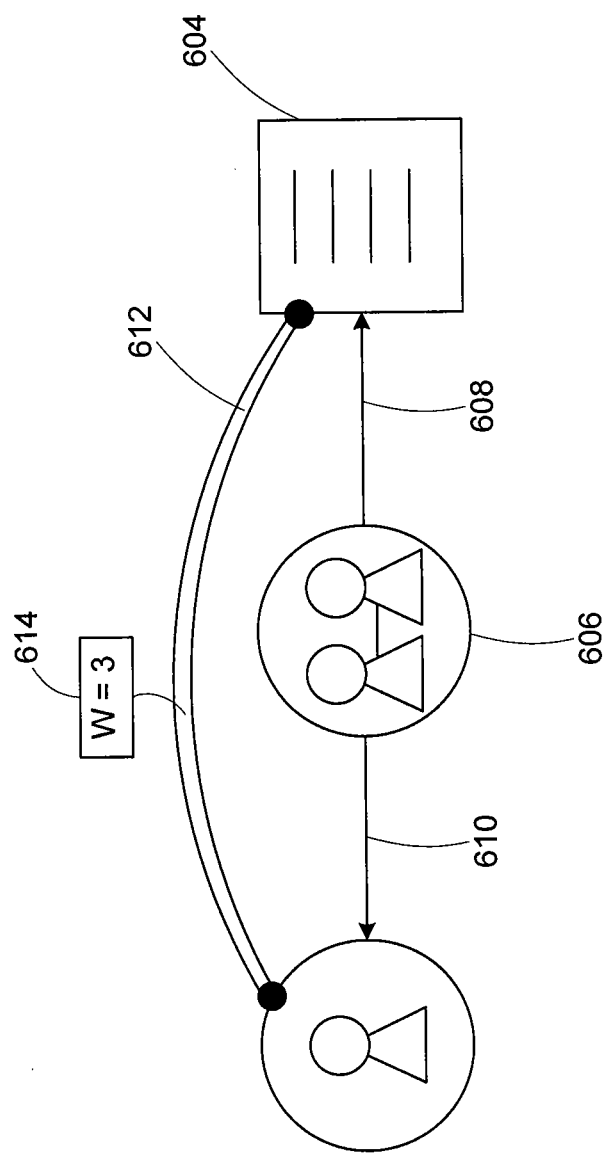

Referring now to FIGS. 6A-6C, therein are shown examples of a social graph 600 illustrating derivation of an implicit social graph connection through a passive connection process, based on an interaction by another account linking the user account to the social object. FIG. 6A illustrates an initial state of the social graph 600. The implicit social graph connection can be an implicit page connection. The social graph 600 includes a user account 602. The social graph 600 also includes a social network page 604. The social network page 604 is linked to an associate account 606 via an interaction 608. The associate account 606 is an entity account within a social networking system with an existing explicit association with the user account 602. For example, the associate account 606 can be a friend account of the user account 602 or a social network group of which the user account 602 is a member. The interaction 608 is an interaction with the social network page 604. For example, the interaction 608 can be a reference action or a communication action as described above in FIG. 4. For example, the interaction 608 can be the associate account 606 checking-in to the social network page 604, the associate account 606 tagging or mentioning the social network page 604 in a photograph, or the associate account 606 posting a comment on the social network page 604.

FIG. 6B illustrates the social graph 600 after recording a trigger action 610 and prior to adding an implicit social graph connection 612. The trigger action 610 can be a reference action. For example, the trigger action 610 can be the associate account 606 mentioning the user account 602 in the comment posted to the social network page 604. The trigger action 610 can also be the associate account 606 mentioning or tagging the user account 602 in the tagged photograph or in the check-in.

FIG. 6C illustrates the social graph 600 after the implicit social graph connection 612 is determined and added onto the social graph 600. The implicit social graph connection 612 is determined by a connection generation module, such as the connection generation module 314 of FIG. 3. The implicit social graph connection 612 connects the user account 602 and the social network page 604 to indicate a likelihood of the user account 602 being interested in contents of the social network page 604. The implicit social graph connection 612 can include an edge weight 614. For example, the edge weight 614 can be the edge weight 114 of FIG. 1, generated by the weight calculation module 322 of FIG. 3. In some embodiments, the edge weight 614 can have a value lower than the edge weight 514 of FIG. 5.

Figure 7A:
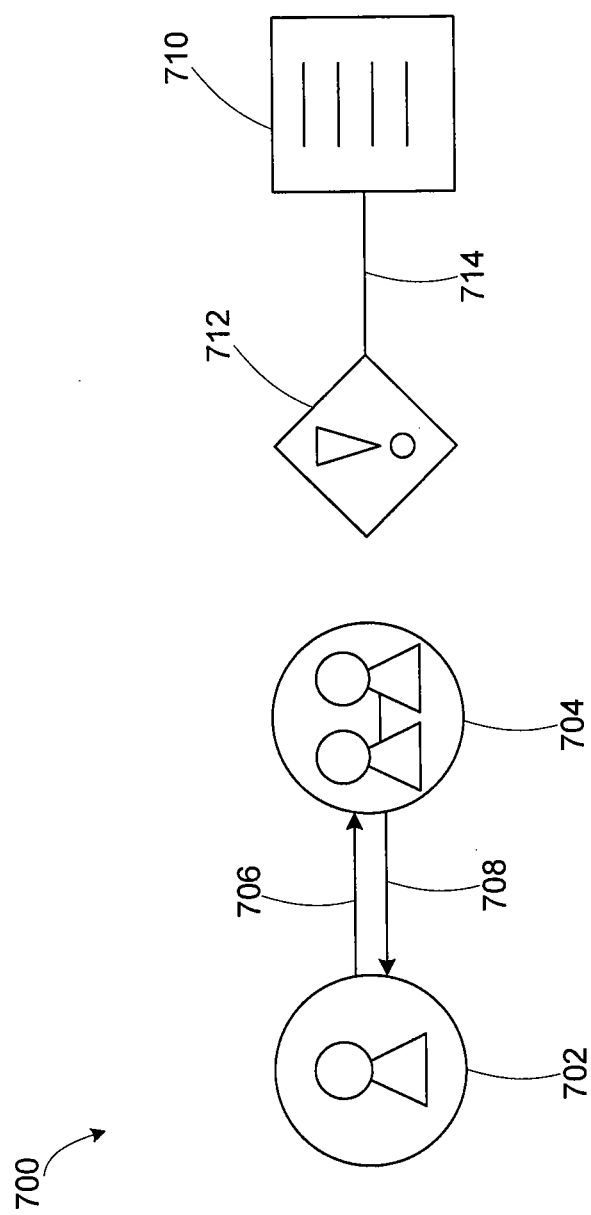
FIGS. 7A-7C are examples of a social graph illustrating derivation of an implicit social graph connection through a bridging interaction process.
Figure 7B:
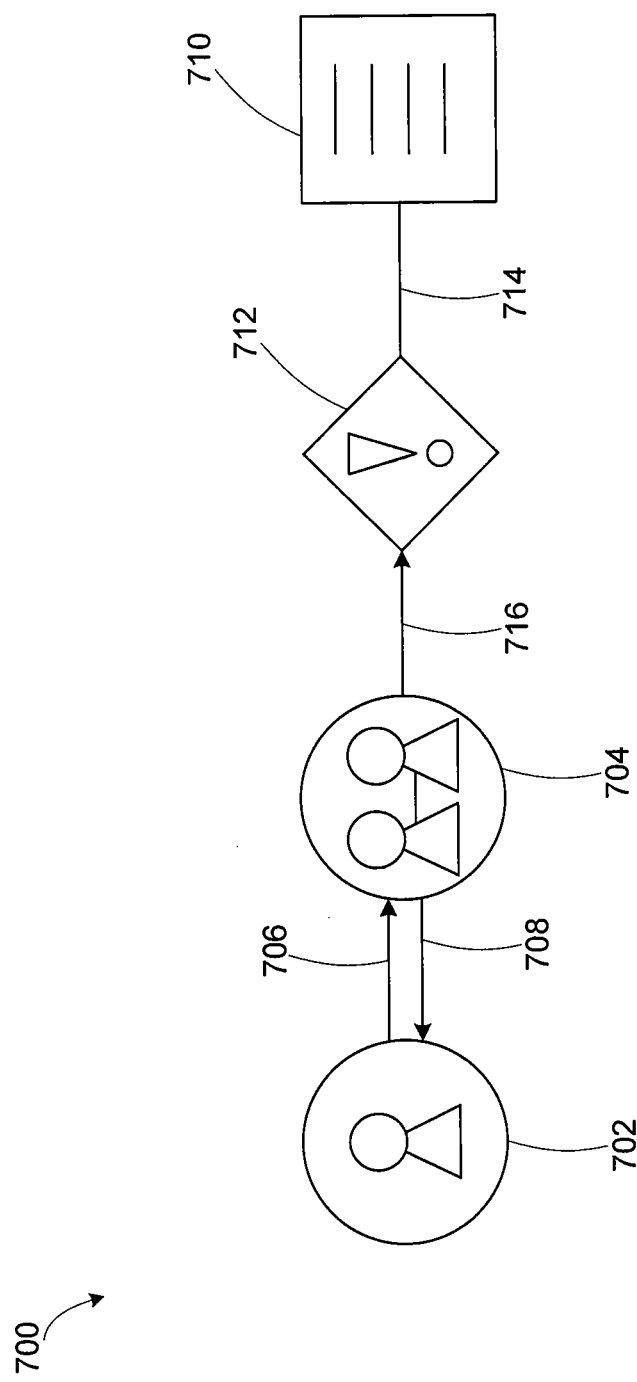
Figure 7C:
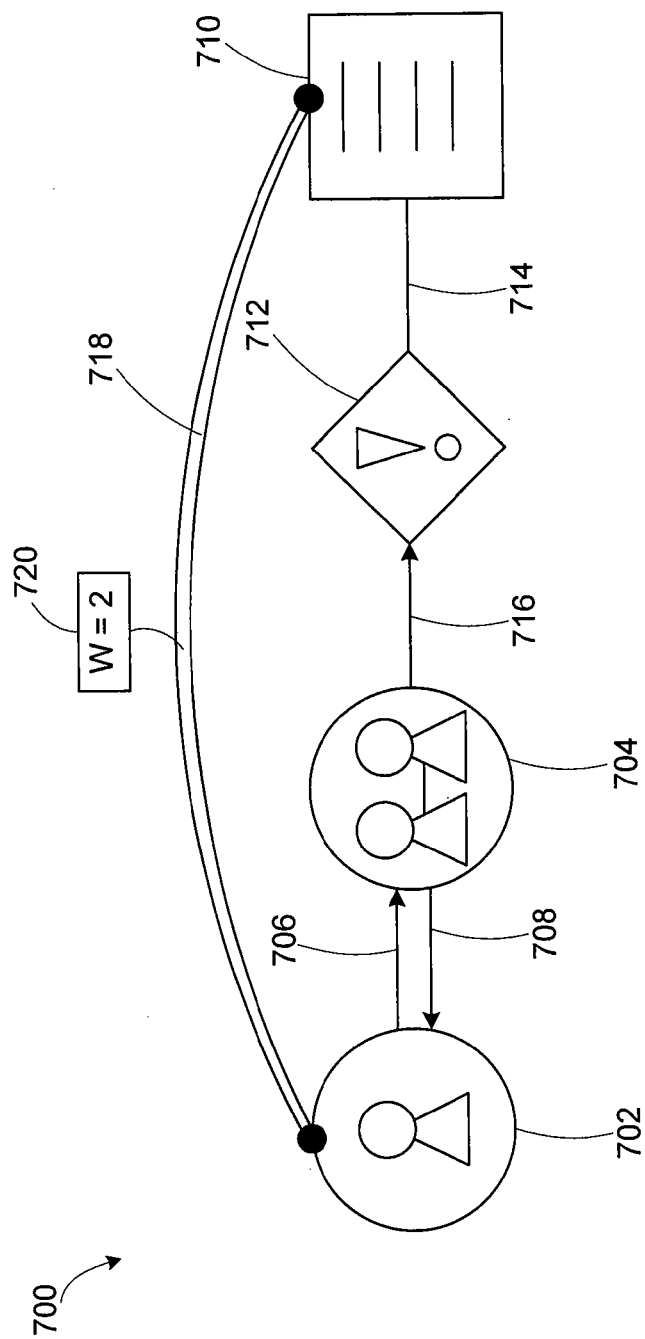

Referring now to FIGS. 7A-7C, therein are shown examples of a social graph 700 illustrating derivation of an implicit social graph connection through a bridging interaction process. The bridging interaction process can be based on a bridging interaction that clarifies that an implicit page connection may already exist. FIG. 7A illustrates an initial state of the social graph 700. The implicit social graph connection can be an implicit page connection. The social graph 700 includes a user account 702. The user account 702 can be connected to an associate account 704 by an interaction A 706. Alternatively or in addition to, the user account 702 can be connected to the associate account 704 by an interaction B 708. For example, the associate account 704 can be a friend account of the user account 702 or a social network group of which the user account 702 is a member.

The interaction A 706 is a user interaction from the user account 702 to the associate account 704. The interaction B 708 is a user interaction from the associate account 704 to the user account 702. The interaction A 706 and the interaction B 708 each can be a reference action, such as tagging or mentioning.

The social graph 700 also includes a social network page 710. The social network page 710 is linked to a page item 712 via a content association 714. The page item 712 is a content, a widget, or an interactive multimedia of the social network page 710. The content association 714 indicates that the page item 712 is specific to the social network page 710. For example, the page item 712 can be the page item 506 of FIG. 5 and the content association 714 can be the content association 508 of FIG. 5.

FIG. 7B illustrates the social graph 700 after recordation of a trigger action 716 and prior to adding an implicit social graph connection 718. The trigger action 716 can be a reference action or a communication action to the page item 712. For example, the trigger action 716 can be a post or a comment to a wall of the page item 712. The trigger action 716 can also be a post, a comment, or a message that mentions and references the page item 712.

FIG. 7C illustrates the social graph 700 after the implicit social graph connection 718 is determined and added onto the social graph 700. The implicit social graph connection 718 is determined by a connection generation module, such as the connection generation module 314 of FIG. 3. The implicit social graph connection 718 connects the user account 702 and the social network page 710 to indicate a likelihood of the user account 702 being interested in contents of the social network page 710. The implicit social graph connection 718 can include an edge weight 720. For example, the edge weight 720 can be the edge weight 114 of FIG. 1, generated by the weight calculation module 322 of FIG. 3. In some embodiments, the edge weight 720 can have a value lower than the edge weight 614 of FIG. 6.

Figure 8A:
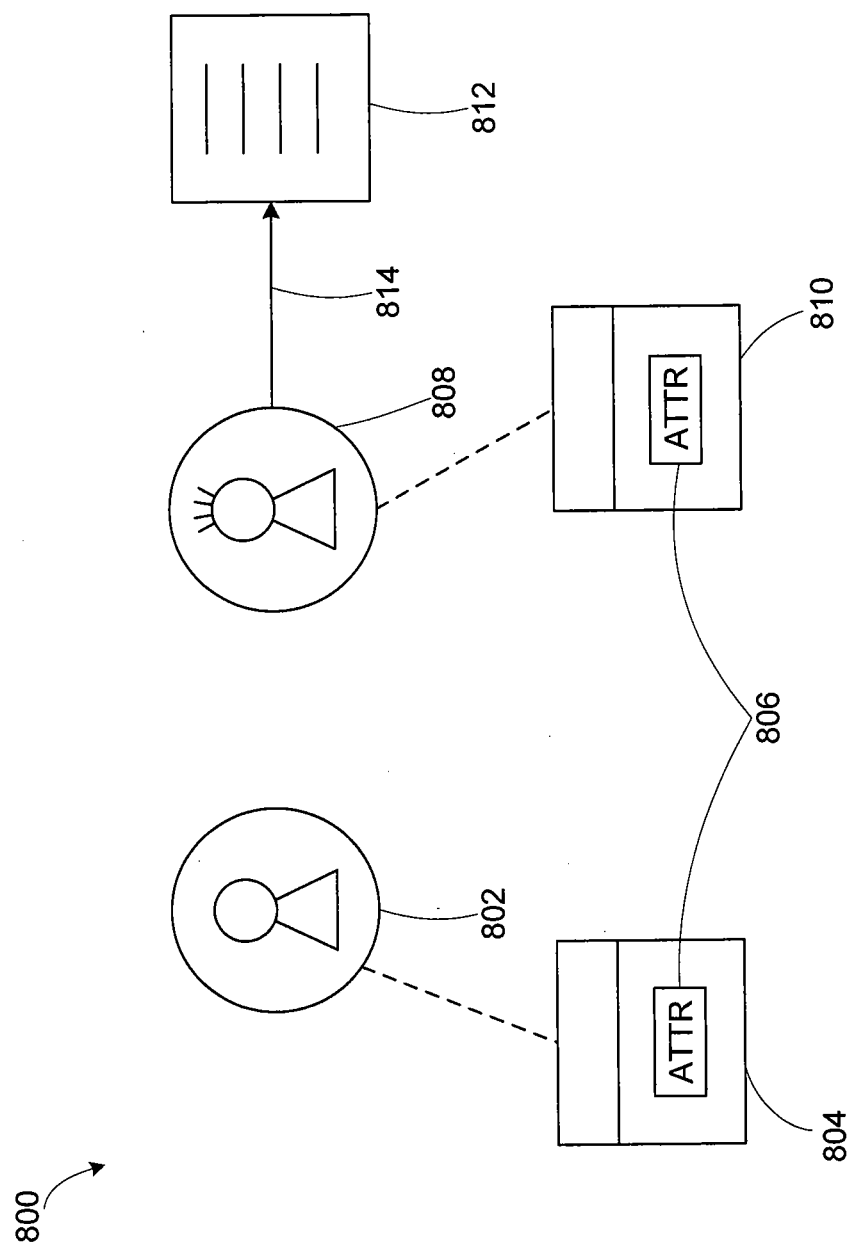
FIGS. 8A-8B are examples of a social graph illustrating derivation of an implicit social graph connection through an account attribute process.
Figure 8B:
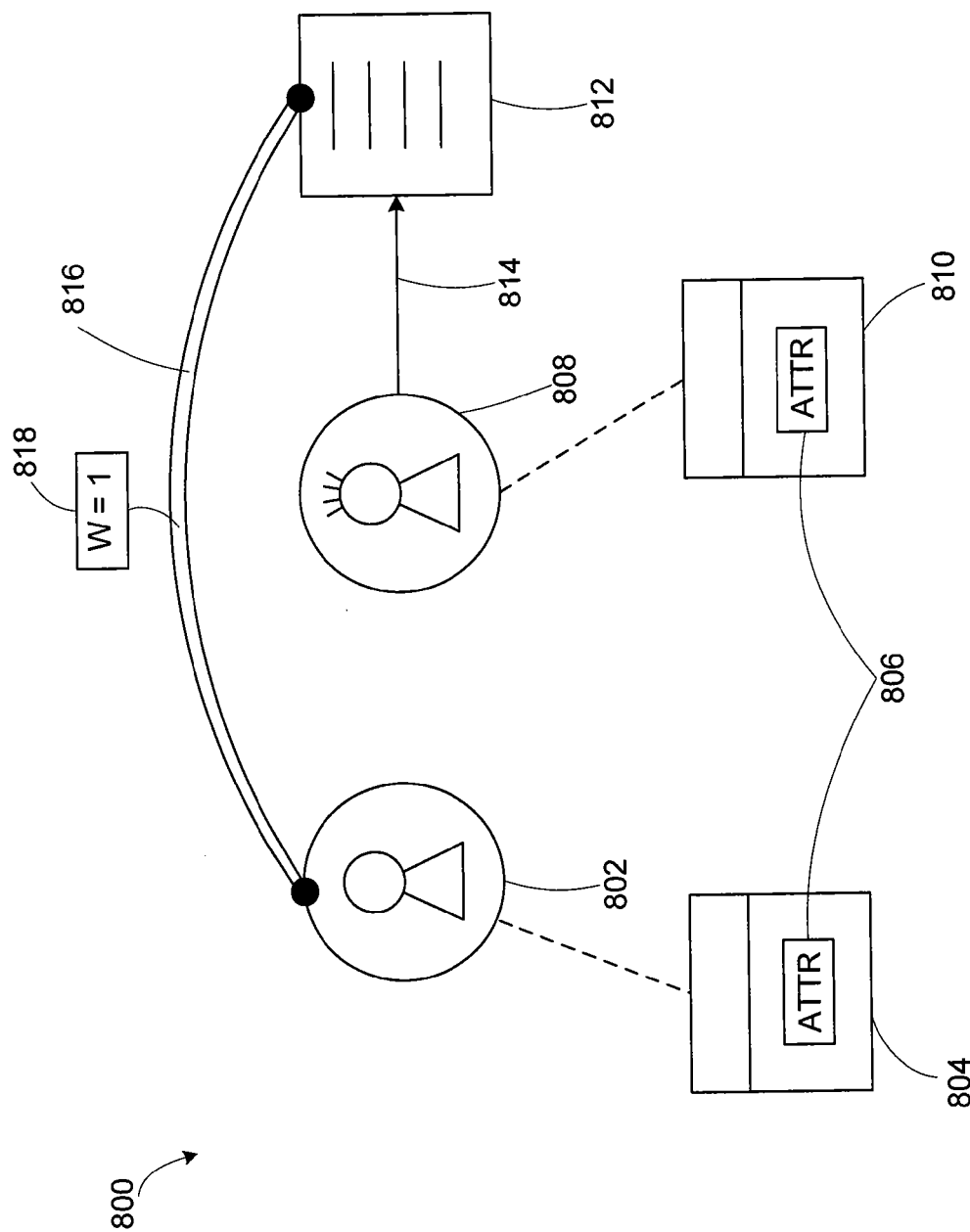

Referring now to FIGS. 8A-8B, therein are shown examples of a social graph 800 illustrating derivation of an implicit social graph connection through an account attribute process. The account attribute process can be based on shared account attributes, where at least one of the accounts already has a social graph connection with the intended social object. FIG. 8A illustrates an initial state of the social graph 800. The implicit social graph connection can be an implicit page connection.

The social graph 800 includes a first user account 802. The first user account 802 has a first account profile 804. The first account profile 804 includes a profile attribute 806. The social graph 800 includes also a second user account 808. The second user account 808 includes a second account profile 810. The second account profile 810 includes the same profile attribute 806 as well. The second user account 808 can be an associate account of the first user account 802, such as a friend account or a group of which the first user account 802 is a member. The second user account 808 can also be a user account in the same region of residence as the first user account 802. The second user account 808 can also be any other user account in the social networking system. The second user account 808 is linked to a social network page 812 by a user interaction 814. The user interaction 814 can be a communication action, a reference action, or an explicit social graph connection. For example, the user interaction 814 can be a post to a wall of the social network page 812, sharing of the social network page 812, a subscription to the social network page 812, or an explicit "like" of the social network page 812.

FIG. 8B illustrates the social graph 800 after an implicit social graph connection 816 is determined and added onto the social graph 800. The implicit social graph connection 816 is determined by a connection generation module, such as the connection generation module 314 of FIG. 3. The implicit social graph connection 816 connects the first user account 802 and the social network page 812 to indicate a likelihood of the first user account 802 being interest in contents of the social network page 812. The implicit social graph connection 816 can include an edge weight 818. For example, the edge weight 818 can be the edge weight 114 of FIG. 1, generated by the weight calculation module 322 of FIG. 3. In some embodiments, the edge weight 818 can have a value lower than the edge weight 720 of FIG. 7.

Figure 9:
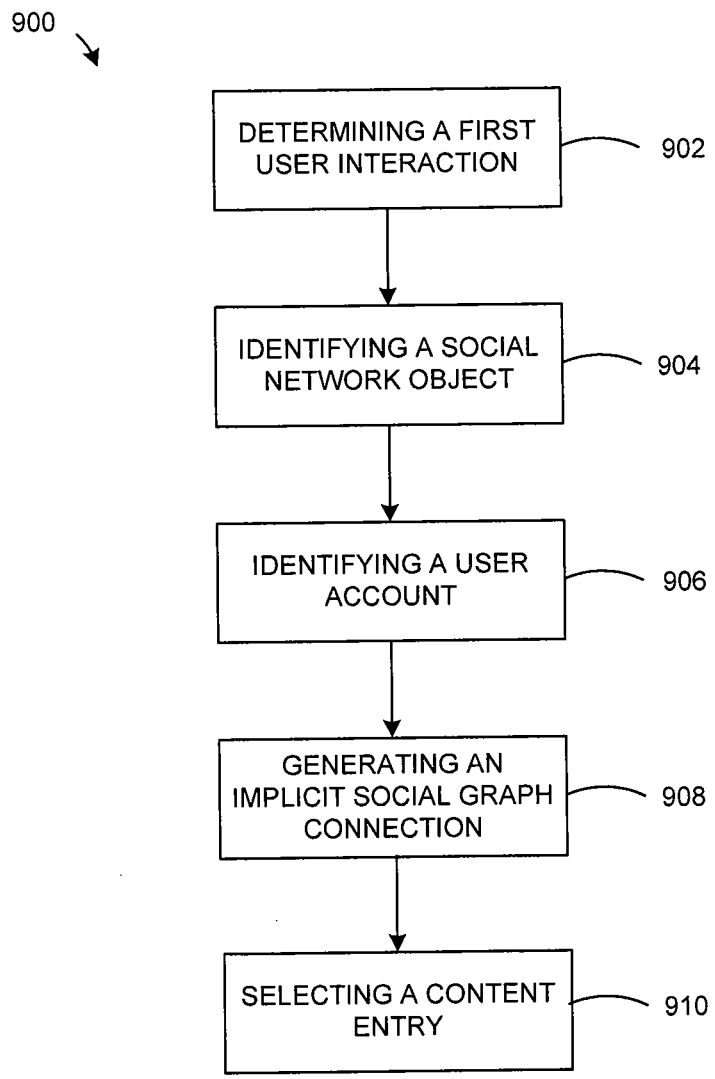
FIG. 9 is a flow chart of a method of operating a social networking system.

Referring now to FIG. 9, therein is shown is a flow chart of a method 900 of operating a social networking system, such as the social networking system 100 of FIG. 1 or the social networking system 202 of FIG. 2. The method 900 includes a method step 902 of determining a first user interaction on a social network system. The first user interaction can be the user interaction 106 of FIG. 1. The social network system can be the social networking system 100 of FIG. 1 or the social networking system 202 of FIG. 2. The method 900 also includes a method step 904 of identifying a social network object in the social network system associated with the first user interaction by traversing a social graph of the social network system. The method step 904 can be performed by a module of the social network system, such as the connection generation module 314 of FIG. 3. The method 900 further includes a method step 906 of identifying a user account based on the first user interaction. The method step 906 can also be performed by a module of the social network system, such as the connection generation module 314 of FIG. 3.

Upon identifying the user account and the social network object, the method 900 includes a method step 908 of generating an implicit social graph connection between the user account and the social network object. Once generated, the implicit social graph connection can be stored in the social graph of the social network system. The method step 908 can be performed by a module of the social network system, such as the connection generation module 314 of FIG. 3. The social network system can utilize the added implicit social graph connection via a connection utilization module, such as the connection utilization module 316 of FIG. 3. The method 900 includes a method step 910 of selecting a content entry for displaying to a user device signed-in under the user account or a friend account based on the implicit social graph connection. The friend account is defined as a socially connected account to the user account, where the social connection is defined within the social graph of the social network system.

Figure 10:
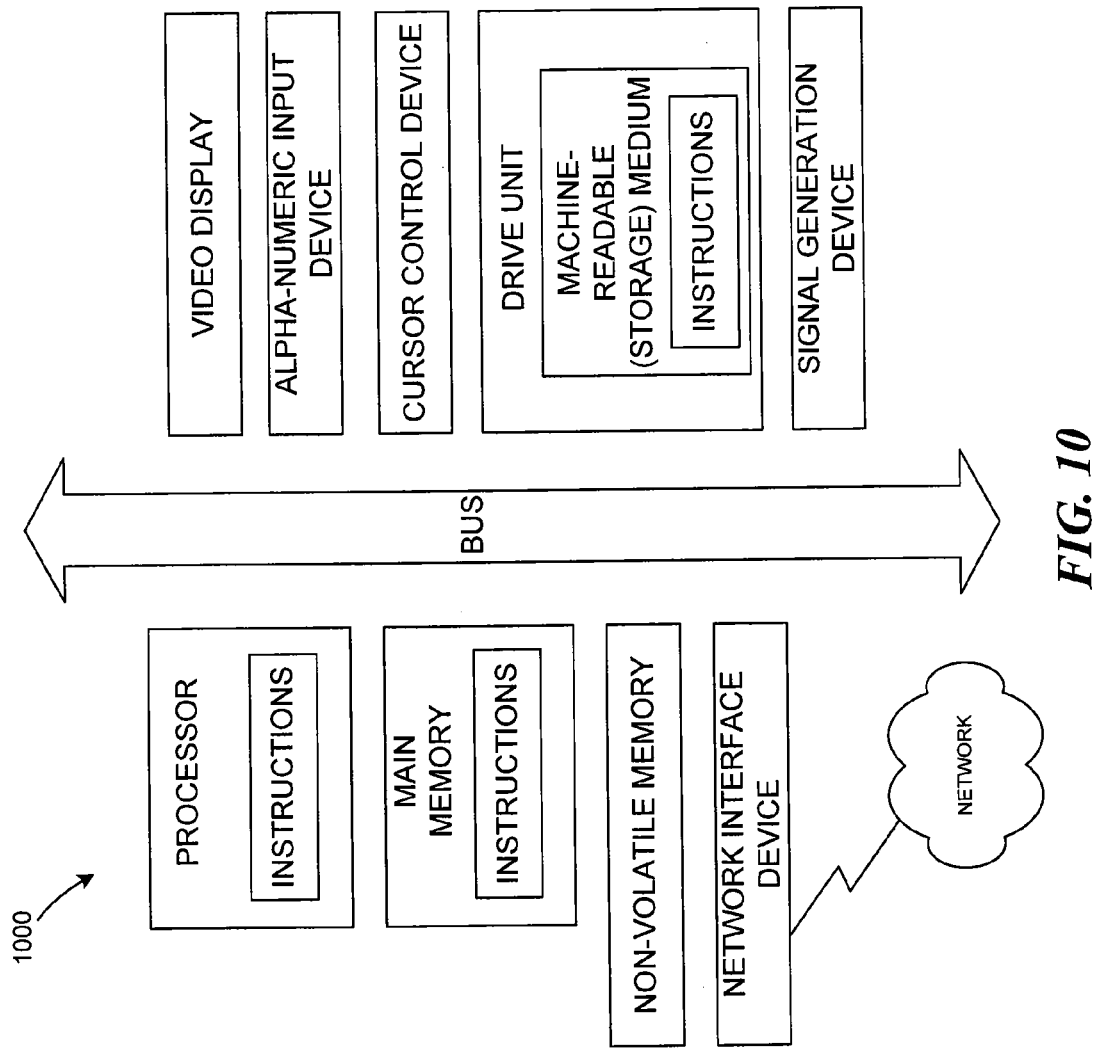
FIG. 10 is a diagrammatic representation of a machine in the example form of a computer system within which a set of instructions, for causing the machine to perform any one or more of the methodologies or modules discussed herein, may be executed.

Referring now to FIG. 10, therein is shown a diagrammatic representation of a machine in the example form of a computer system 1000 within which a set of instructions, for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIGS. 1-3 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    determining a first user interaction represented by an existing social graph connection in a social graph maintained by a social network system;
    identifying a social network object in the social network system associated with the first user interaction by traversing the social graph of the social network system;
    identifying a user account based on the first user interaction;
    generating an implicit social graph connection between the identified user account and the identified social network object based on the determined first user interaction, the existing social graph connection associated with the first user interaction does not involve both the user account and the social network object;
    storing the implicit social graph connection in the social graph of the social network system; and
    selecting a content entry for displaying to a user device based on the implicit social graph connection.

2. The method of claim 1, wherein identifying the user account includes identifying the user account that initiated the first user interaction or the user account involved in the first user interaction.

3. The method of claim 1, wherein identifying the social network object includes identifying the social network object by identifying a link, a reference, or a content of the social network object directly or indirectly involved in the first user interaction.

4. The method of claim 1, further comprising:
    generating an origination explanation for the content entry for displaying to the user device signed-in under the user account;
    wherein the origination explanation indicates that the first user interaction is what triggered the selecting of the content entry.

5. The method of claim 1, wherein identifying the user account includes identifying the user account sharing an attribute entry that is same as a related account involved with the first user interaction.

6. The method of claim 1, further comprising receiving the first user interaction from a social plug-in to the social network system.

7. The method of claim 1, further comprising generating a confirmation request to the user account based on the implicit social graph connection, the confirmation request for converting the implicit social graph connection to an explicit social graph connection.

8. A method comprising:
    determining a first user interaction represented by an existing social graph connection in a social graph maintained by a social network system;
    identifying a social network page in the social network system associated with the first user interaction by traversing the social graph of the social network system;
    identifying a user account based on the first user interaction;
    generating an implicit social graph connection between the identified user account and the identified social network page based on the determined first user interaction, wherein the existing social graph connection associated with the first user interaction does not involve both the user account and the social network page;

determining an edge weight of the implicit social graph connection;

storing the implicit social graph connection in the social graph of the social network system; and selecting a content entry for displaying to a user device based on the implicit social graph connection.

9. The method of claim 8, wherein determining the edge weight includes determining the edge weight based on a geographical proximity of a location associated with the user account and a location associated with the social network page.

10. The method of claim 8, further comprising:
receiving a second user interaction involving the social network page; and
adjusting the edge weight based on the second user interaction.

11. The method of claim 8, further comprising:
accessing an account profile of the user account; and
wherein determining the edge weight is based on the account profile.

12. The method of claim 8, further comprising:
accessing a page profile of the social network page including a business type; and
wherein determining the edge weight is based on the page profile.

13. The method of claim 8, further comprising:
generating an edge weight model based on explicit social graph connections in the social graph, the edge weight model specific to a page node type and a user account node type in the social graph;
wherein determining the edge weight is based on the edge weight model.

14. The method of claim 8, wherein determining the edge weight is based on a history of user interactions related the user account and the social network page.

15. The method of claim 14, wherein determining the edge weight is based on a frequency of the user interactions related the user account and the social network page.

16. The method of claim 8, wherein selecting the content entry includes selecting an advertisement object for displaying to the user device signed-in under the user account based on the edge weight of the implicit social graph connection.

17. The method of claim 8, wherein selecting the content entry includes selecting a news feed for displaying to the user device signed-in under the user account based on the edge weight of the implicit social graph connection.

18. A social networking system comprising:
a processor;
a non-transitory memory;
an action logger configured to record a first user interaction represented by an existing social graph connection in a social graph maintained by the social networking system;
a connection generation module configured to:
identify a social network page in the social networking system associated with the first user interaction by traversing the social graph of the social networking system;
identify a user account based on the first user interaction;
generate an implicit social graph connection between the user account and the social network page based on the first user interaction, wherein the existing social graph connection associated with the first user interaction does not involve both the user account and the social network page; and
store the implicit social graph connection in the social graph of the social networking system; and
a connection utilization module configured to select a content entry for displaying to a user device based on the implicit social graph connection;
wherein the action logger, the connection generation module, and the connection utilization module are implemented as instructions stored on the non-transitory memory and the instructions are executable by the processor.

19. The social networking system of claim 18, wherein the connection generation module is configured to identify the user account that initiated the first user interaction or the user account involved in the first user interaction.

20. The social networking system of claim 18, wherein the connection generation module is configured to identify the social network page by identifying a link, a reference, or a content of the social network page directly or indirectly involved with the first user interaction.

\* \* \* \* \*